United States Patent
Yoshida

(10) Patent No.: US 8,122,462 B2
(45) Date of Patent: Feb. 21, 2012

(54) PANEL ATTACHMENT STRUCTURE FOR DISK TRAY

(75) Inventor: Kazuyoshi Yoshida, Osaka (JP)

(73) Assignee: Funai Electronic Co., Ltd., Osaka (JP)

( * ) Notice: Subject to any disclaimer, the term of this patent is extended or adjusted under 35 U.S.C. 154(b) by 387 days.

(21) Appl. No.: 12/431,104

(22) Filed: Apr. 28, 2009

(65) Prior Publication Data

US 2009/0328082 A1 Dec. 31, 2009

(30) Foreign Application Priority Data

Jun. 27, 2008 (JP) .................................. 2008-168393

(51) Int. Cl.
*G11B 33/02* (2006.01)
(52) U.S. Cl. ...................................................... 720/646
(58) Field of Classification Search .................. 720/623, 720/624, 646, 647
See application file for complete search history.

(56) References Cited

U.S. PATENT DOCUMENTS

| | | | |
|---|---|---|---|
| 6,137,760 A | 10/2000 | Okamoto | |
| 7,043,740 B2 * | 5/2006 | Chen et al. | 720/610 |
| 7,055,160 B1 * | 5/2006 | Tan et al. | 720/647 |
| 7,363,636 B2 * | 4/2008 | Suzuki | 720/647 |
| 7,506,346 B2 * | 3/2009 | Ogasawara et al. | 720/624 |
| 7,577,966 B2 * | 8/2009 | Ogasawara et al. | 720/624 |
| 7,958,520 B2 * | 6/2011 | Jitsukawa et al. | 720/623 |
| 2005/0216924 A1 | 9/2005 | Lu | |
| 2005/0273796 A1 | 12/2005 | Tseng et al. | |
| 2006/0265723 A1 | 11/2006 | Ishihara et al. | |

FOREIGN PATENT DOCUMENTS

| | | | |
|---|---|---|---|
| JP | 2006-134414 A | 5/2006 | |
| JP | 2006-323928 A | 11/2006 | |

* cited by examiner

*Primary Examiner* — Hoai V Ho
*Assistant Examiner* — Pablo Huerta
(74) *Attorney, Agent, or Firm* — Global IP Counselors

(57) ABSTRACT

A panel attachment structure for a disk tray includes an attachment frame, a decoration panel, a spring body, a restricting mechanism and a positioning mechanism. The attachment frame is non-movably coupled to a front end portion of the disk tray. The disk tray is movable between an ejected position and a retracted position through a tray opening of a cabinet. The decoration panel is movably coupled to the attachment frame. The spring body includes a compression coil spring. The spring body elastically couples the decoration panel to the attachment frame and biases the decoration panel against the attachment frame. The restricting mechanism restricts displacement of the decoration panel relative to the attachment frame. The positioning mechanism selectively positions the decoration panel relative to the attachment frame in a predetermined position and releases the decoration panel from the predetermined position when the disk tray is retracted to the retracted position.

13 Claims, 16 Drawing Sheets

PANEL ATTACHMENT STRUCTURE FOR DISK TRAY

CROSS-REFERENCE TO RELATED APPLICATIONS

This application claims priority to Japanese Patent Application No. 2008-168393 filed on Jun. 27, 2008. The entire disclosure of Japanese Patent Application No. 2008-168393 is hereby incorporated herein by reference.

BACKGROUND OF THE INVENTION

1. Field of the Invention

The present invention generally relates to a panel attachment structure. More specifically, the present invention relates to a panel attachment structure for a disk tray.

2. Background Information

A loader (such as a DVD loader) optically processes a disk (e.g., recording medium). The loader has a disk tray for moving the disk in and out with respect to a disk processing position for optical processing. The loader is housed in a cabinet with an opening. The disk tray is movable through the opening of the cabinet between an ejected position (e.g., open position) outside of the cabinet and a retracted position (e.g., closed position) inside of the cabinet.

The cabinet is formed in a box shape that is wider in a width direction than in a height direction. The cabinet has a front panel, a bottom chassis and a top case that form the box shape.

The disk tray is movable outward and inward through the opening formed in the front panel of the cabinet. The disk is placed on, or removed from the disk tray when the disk tray is moved outside of the opening to the ejected position. After the disk has been placed on the disk tray, the disk tray moves back through the opening. Then, the disk is conveyed to the disk processing position.

The opening is formed in a bottom portion of a recess formed on the front panel. More specifically, the opening is formed in a rectangular shape. The opening is bounded by the bottom portion of the recess.

A decoration panel (e.g., tray panel or tray decoration) is attached to the disk tray. The decoration panel is longer in a width direction. The decoration panel covers a front end of the disk tray. When the disk tray is moved back inside the opening and the disk is conveyed to the disk processing position, the decoration panel fits into the recess and blocks off the opening from outside. The decoration panel fits into the recess and hides the opening, which enhances the appearance of the cabinet.

The decoration panel is not formed integrally with the disk tray, and is instead attached as a separate member to the front end of the disk tray. This is because the size of the decoration panel is set such that the decoration panel fits into the recess, but does not pass through the opening. Since the decoration panel is too large to fit through the opening, if the decoration panel is attached to the disk tray before the loader having the disk tray is mounted in the cabinet, it will be impossible to take the decoration panel outside of the recess. Thus, the decoration panel has to be installed to the front end of the disk tray sticking outside of the opening after the loader has been mounted in the cabinet.

Also, the decoration panel has an attachment frame formed from plastic and integrally with the decoration panel. The attachment frame is fixed with a suitable structure, such as a screw fastening structure or an engagement structure, to the front end of the disk tray, so that the decoration panel was immovably attached to the front end of the disk tray.

However, when the decoration panel is fitted into the recess of the front panel, if the decoration panel is tilted within the recess or is offset within the recess, this misalignment is noticeable and deteriorates the appearance of the cabinet.

Meanwhile, with a conventional structure, the decoration panel is immovably fixed to the front end of the disk tray for attaching the decoration panel to the front end of the disk tray (see Japanese Laid-Open Patent Application Publication No. 2006-134414, for example). With the conventional structure, a position restrictor is provided for performing centering (or guiding) the decoration panel to the center of the recess and positioning the decoration panel when the decoration panel is fitted into the edge portion of the opening or the recess.

With the conventional structure, the loader having the disk tray is fixed by screws in a proper position on the bottom chassis of the cabinet. However, sometimes the loader is attached crookedly, or there is too much looseness between the loader and the bottom chassis. Some variance in the precision of the loader attachment position is also inevitable. Furthermore, the front panel or the bottom chassis of the cabinet can be tilted within the nominal range. Accordingly, when the disk tray moves back to the retracted position and the decoration panel fits into the recess of the front panel and blocks off the opening, there is the risk that the decoration panel is crooked in the recess, or not centered in the recess, which deteriorates the appearance of the cabinet.

In view of this, with another conventional structure, the assembly looseness that is inevitably present in the attached portion of the disk tray of the loader is utilized to center the decoration panel attached to the disk tray in the recess of the cabinet. However, with the conventional structure, the decoration panel is only centered in the recess within a range that is absorbed by the assembly looseness. Thus, the range over which the decoration panel can be aligned is limited.

Meanwhile, with a conventional recording and reproducing device, a decoration panel is attached via an attachment frame to the front end of a disk tray (see Japanese Laid-Open Patent Application Publication No. 2006-323928, for example). The attachment frame is separate from the decoration panel. A tension coil spring is used to link the attachment frame and the decoration panel, which permits displacement of the decoration panel with respect to the disk tray. With the conventional recording and reproducing device, the decoration panel is constantly pulled toward the attachment frame fixed to the disk tray by the action of the tension coil spring. When the disk tray moves back to a retracted position, the decoration panel is elastically pressed against an edge of an opening. Then, the tension coil spring is stretched out so that the attachment frame moves a short distance away from the decoration panel.

The displacement of the decoration panel with respect to the disk tray is permitted with the conventional recording and reproduction device. Thus, even if there is variance in the precision of the loader attachment position, or even if the front panel or bottom chassis is crooked, it is believed that this will have no effect, and that tilt of the decoration panel within the recess in the front panel can be corrected. Therefore, the appearance of the cabinet is not diminished.

However, with the conventional recording and reproduction device, the tension coil spring is interposed between the decoration panel and the attachment frame fixed to the disk tray. Therefore, the difficult job of hooking hooks at two ends of the tension coil spring to spring catches on the decoration panel and the attachment frame has to be carried out in a tight space. Thus, skill is required in assembly, and furthermore, it is very likely that this assembly work will slow down the assembly process.

In view of the above, it will be apparent to those skilled in the art from this disclosure that there exists a need for an improved panel attachment structure. This invention addresses this need in the art as well as other needs, which will become apparent to those skilled in the art from this disclosure.

SUMMARY OF THE INVENTION

The present invention was conceived in light of the above mentioned problems. One object of the present invention is to provide a panel attachment structure in which assembly process is made easier.

In accordance with one aspect of the present invention, a panel attachment structure for a disk tray includes an attachment frame, a decoration panel, a spring body, a restricting mechanism and a positioning mechanism. The attachment frame is non-movably coupled to a front end portion of the disk tray. The disk tray is movable between an ejected position and a retracted position through a tray opening of a cabinet. The ejected position is located outside of the cabinet. The retracted position is located inside of the cabinet. The decoration panel is movably coupled to the attachment frame and arranged to cover the tray opening of the cabinet when the disk tray is retracted to the retracted position. The spring body includes a compression coil spring. The spring body elastically couples the decoration panel to the attachment frame and biases the decoration panel against the attachment frame such that the spring body allows displacement of the decoration panel relative to the attachment frame in a displacement direction intersecting with a movement direction of the disk tray between the ejected position and the retracted position. The restricting mechanism is arranged to restrict the displacement of the decoration panel relative to the attachment frame in the displacement direction. The positioning mechanism selectively positions the decoration panel relative to the attachment frame in a predetermined position and releases the decoration panel from the predetermined position when the disk tray is retracted to the retracted position.

With the panel attachment structure, it is possible to provide a panel attachment structure in which assembly process is made easier.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure:

FIG. 16 is a diagram illustrating an action of the spring body illustrated in FIG. 14.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 1:
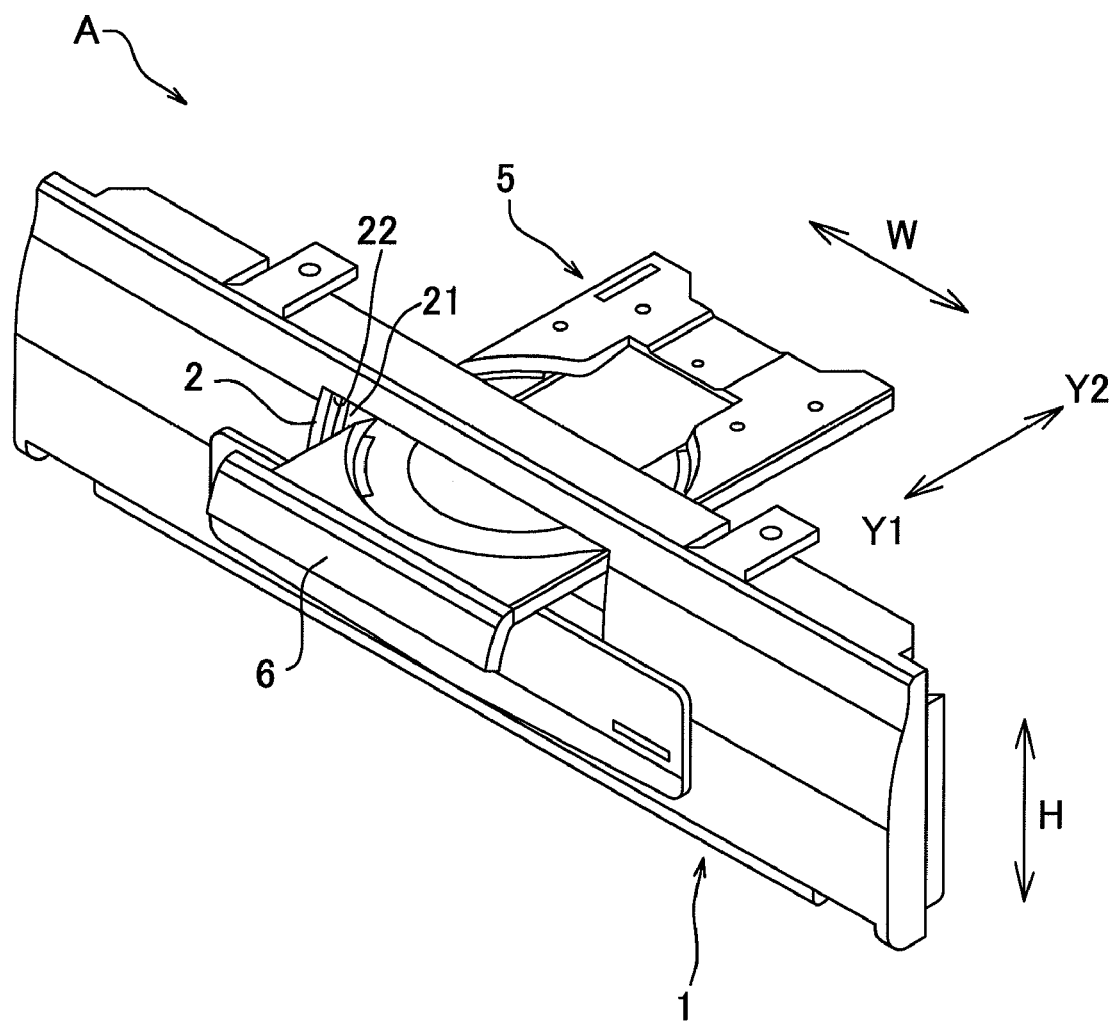
FIG. 1 is a perspective view of a panel attachment structure in accordance with one embodiment of the present invention.

As shown in FIG. 1, a disk device has a loader (e.g., DVD loader) and a cabinet. The loader optically processes a disk (e.g., recording medium). The loader has a panel attachment structure A and a disk tray 5. The disk tray 5 moves the disk in and out with respect to a disk processing position for optical processing. The loader is housed in the cabinet. The cabinet is formed in a box shape that is wider in a width direction W than in a height direction H. The cabinet has a front panel 1, a bottom chassis (not shown) and a top case (not shown) that form the box shape. The front panel 1 has an opening 21. The disk tray 5 is movable through the opening 21 of the cabinet between an ejected position (e.g., open position) outside of the cabinet and a retracted position (e.g., closed position) inside of the cabinet.

Specifically, the disk tray 5 is movable outward (as indicated by the arrow Y1) and inward (as indicated by the arrow Y2) through the opening 21 of the front panel 1. The disk is placed on, or removed from the disk tray 5 when the disk tray 5 has moved outside of the opening 21 as indicated by the arrow Y1 and has reached the ejected position. After the disk has been placed on the disk tray 5, the disk tray 5 moves back through the opening 21 in the direction of the arrow Y2. Then, the disk is conveyed to the disk processing position.

Figure 11:
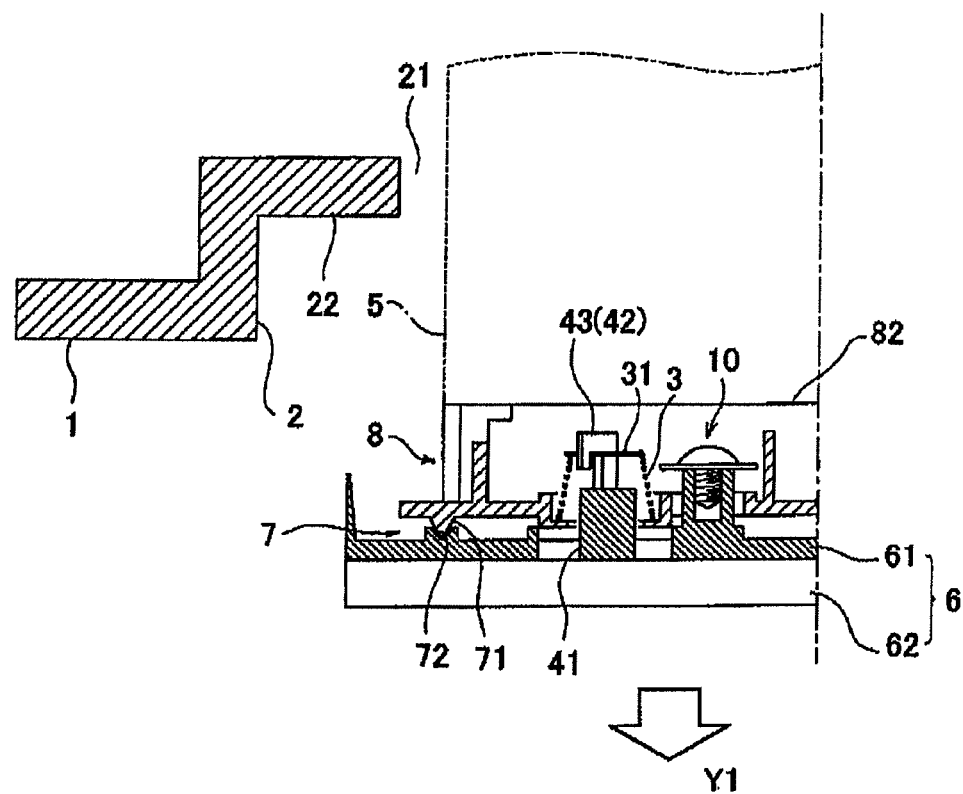
FIG. 11 is a cross sectional view of the panel attachment structure when a disk tray is moving between an ejected position and an retracted position.
Figure 12:
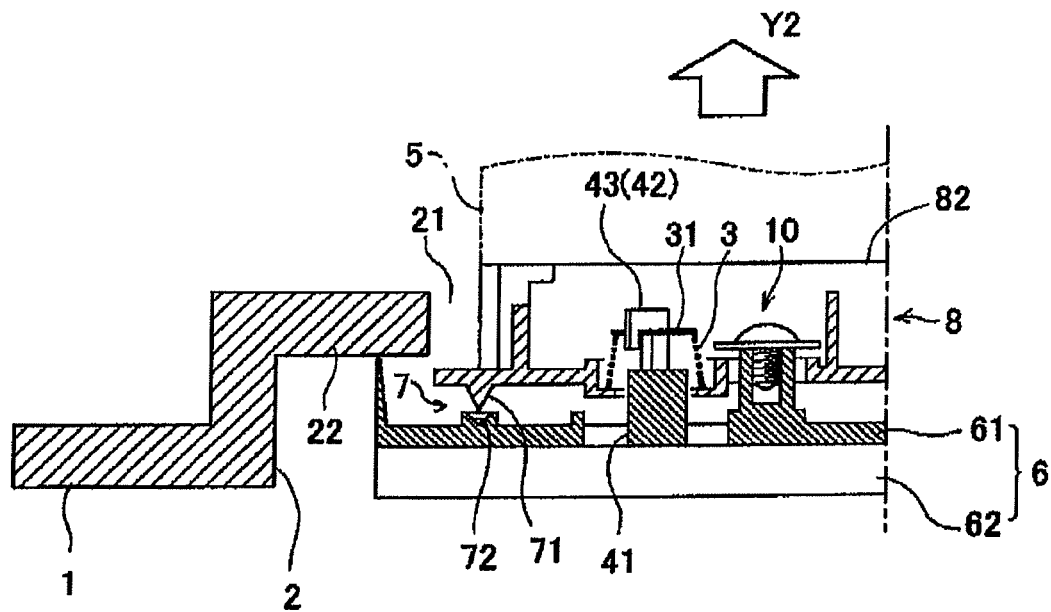
FIG. 12 is a cross sectional view of the panel attachment structure when the disk tray is moving toward the retracted position.
Figure 13:
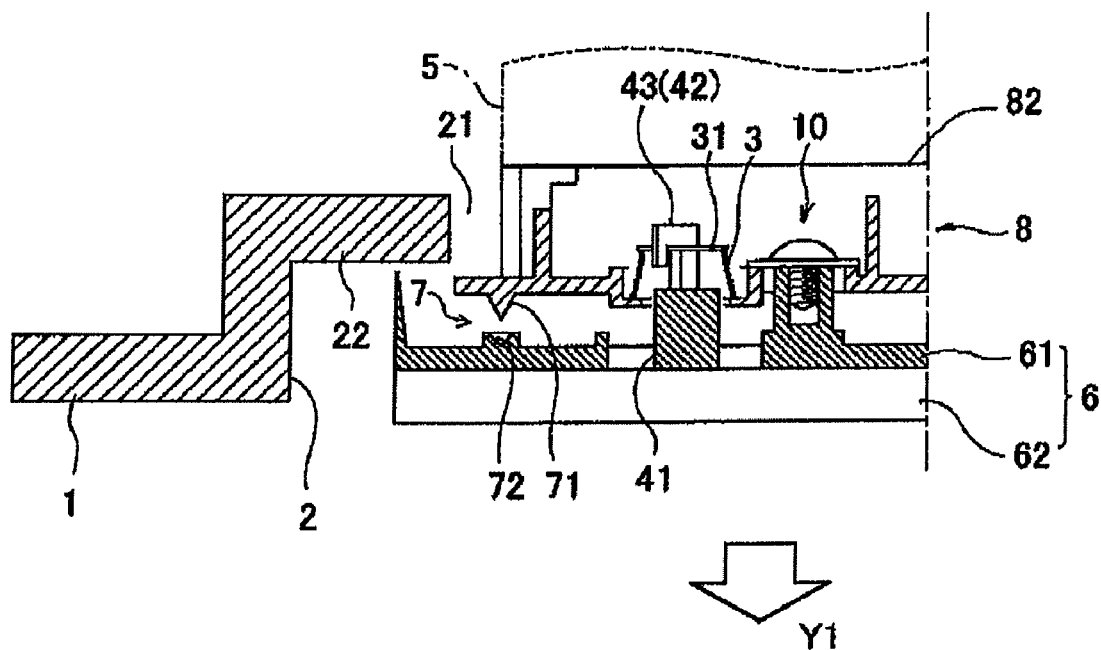
FIG. 13 is a cross sectional view of the panel attachment structure when the disk tray is located at the retracted position.

The opening 21 is formed in a bottom portion 22 of a recess 2 formed on the front panel 1. More specifically, the opening 21 is formed in a rectangular shape that is longer in the width direction W than in the height direction H. The bottom portion 22 of the recess 2 has a rectangular ring shape. The opening 21 is bounded by the bottom portion 22 of the recess 2. The recess 2, the bottom portion 22 and the opening 21 of the front panel 1 are also depicted in FIGS. 11 to 13.

Figure 2:
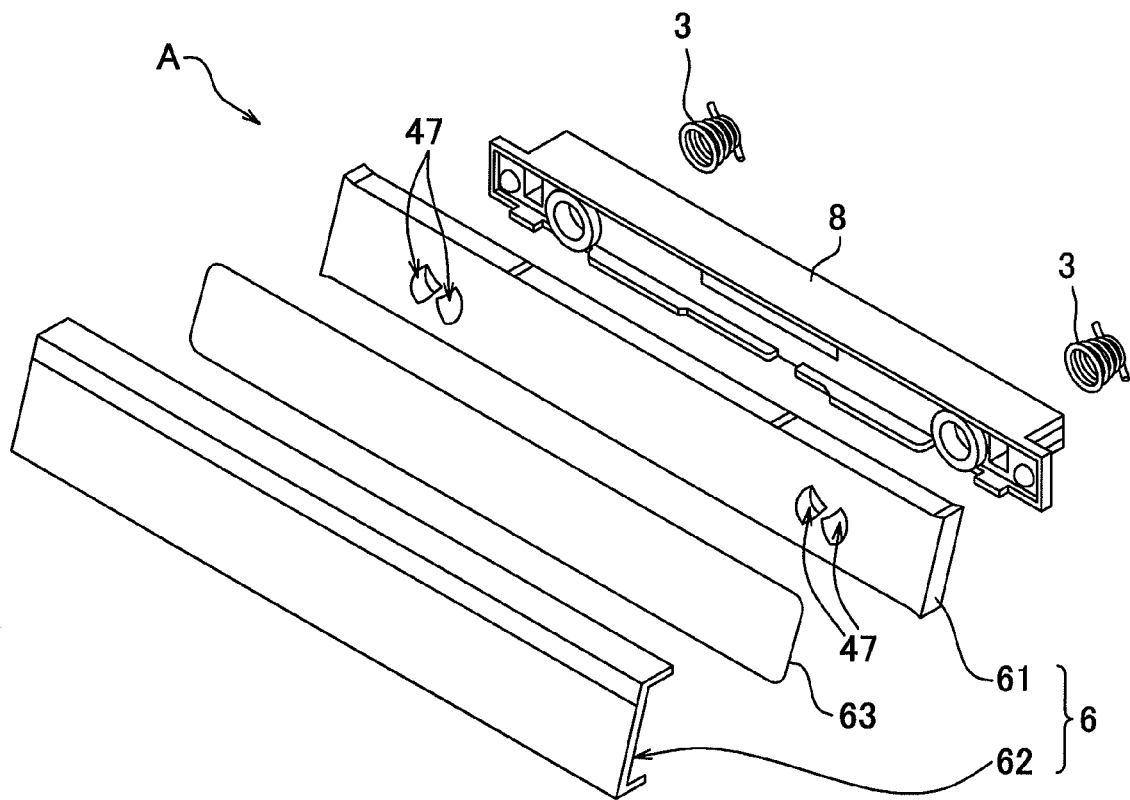
FIG. 2 is an exploded front perspective view of the panel attachment structure illustrated in FIG. 1.

As shown in FIG. 2, the panel attachment structure A has a pair of spring bodies 3, a decoration panel 6 and an attachment frame 8. The decoration panel 6 is longer in the width direction W than in the height direction H. The decoration panel 6 is attached to the disk tray 5 so as to cover a front end portion of the disk tray 5. When the disk tray 5 is moved back inside of the opening 21 as indicated by the arrow Y2 and the disk is conveyed to the disk processing position, the decoration panel 6 fits into the recess 2 and cover the opening 21 from outside. The decoration panel 6 fits into the recess 2 and hides the opening 21, which enhances the appearance of the cabinet.

The decoration panel 6 is not formed integrally with the disk tray 5. The decoration panel 6 is instead attached as a separate member to the front end portion of the disk tray 5. The size of the decoration panel 6 is set such that the decoration panel 6 fits into the recess 2, but does not pass through the opening 21. The decoration panel 6 is too large to pass through the opening 21. Thus, if the decoration panel 6 is attached to the disk tray 5 before the loader with the disk tray 5 is mounted in the cabinet, it will be impossible to take the decoration panel 6 outside of the recess 2. Therefore, the decoration panel 6 is installed to the front end portion of the disk tray 5 sticking outside of the opening 21 after the loader is mounted in the cabinet.

As shown in FIG. 2, the decoration panel 6 has a panel main body 61, a front decorative panel 62. The panel main body 61 is a plastic molding that is wider in the width direction W than in the height direction H. The front decorative panel 62 is made of aluminum. The panel main body 61 and the front decorative panel 62 are integrally joined with a double-sided adhesive tape 63.

Figure 3A:
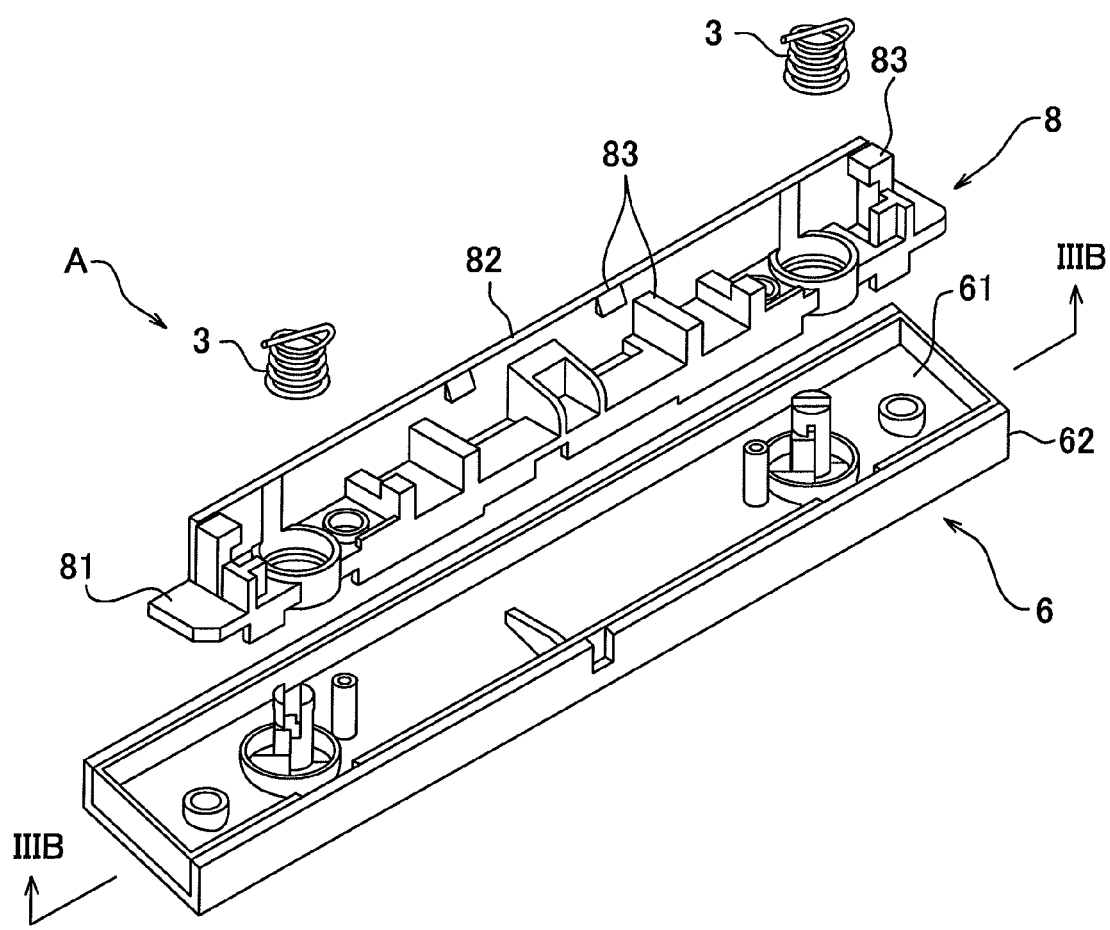
FIG. 3A is an exploded rear perspective view of the panel attachment structure illustrated in FIG. 1.
Figure 3B:
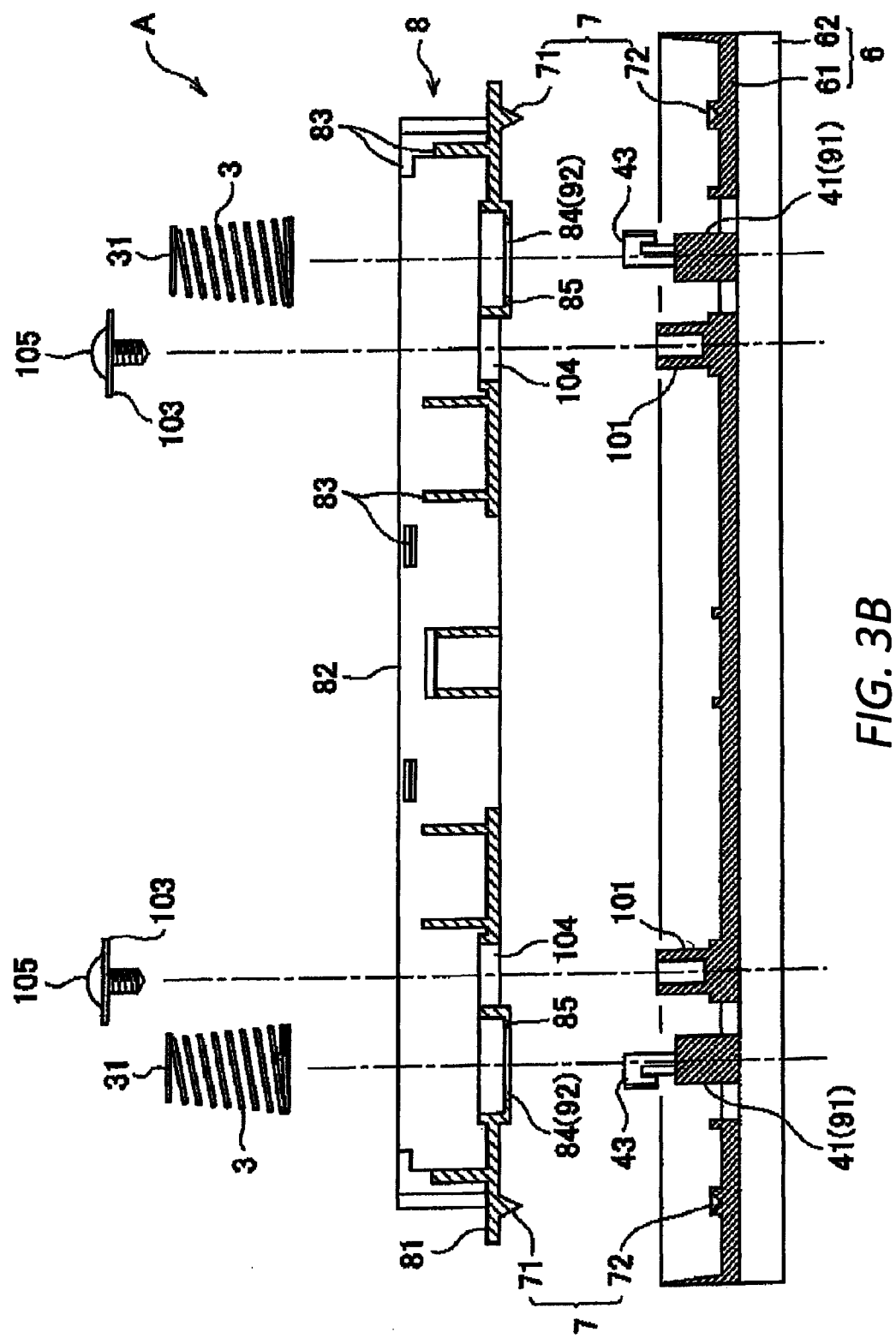
FIG. 3B is an exploded cross sectional view of the panel attachment structure taken along IIIB-IIIB line in FIG. 3A.

As shown in FIGS. 3A and 3B, the attachment frame 8 is formed as a separate member that is separated from the decoration panel 6. The attachment frame 8 is fixedly attached to the front end portion of the disk tray 5. The attachment frame 8 has an oblong front plate 81, a blind plate 82 and an attachment mechanism 83. The attachment frame 8 is integrally formed as a one-piece, unitary member. The blind plate 82 extends from a upper end portion of the front plate 81. The attachment mechanism 83 has a plurality of ribs or latching tabs. The attachment mechanism 83 immovably fixes the attachment frame 8 to the front end portion of the disk tray 5.

The spring bodies 3 link the attachment frame 8 and the decoration panel 6. Each of the spring bodies 3 includes a compression coil spring. The spring bodies 3 cause the attachment frame 8 and the decoration panel 6 to be constantly and elastically biased toward each other in backward and forward directions (the directions indicated by the arrows Y1 and Y2 in FIG. 1). The spring bodies 3 also allow displacement of the decoration panel 6 relative to the attachment frame 8 in a displacement direction that intersects with the backward and forward directions. The displacement direction includes the height direction H and the width direction W, which are perpendicular to the backward and forward directions, as well as any directions that are at some angle to the backward and forward directions.

The panel attachment structure A will further be described through reference to FIGS. 3A to 10.

Figure 7:
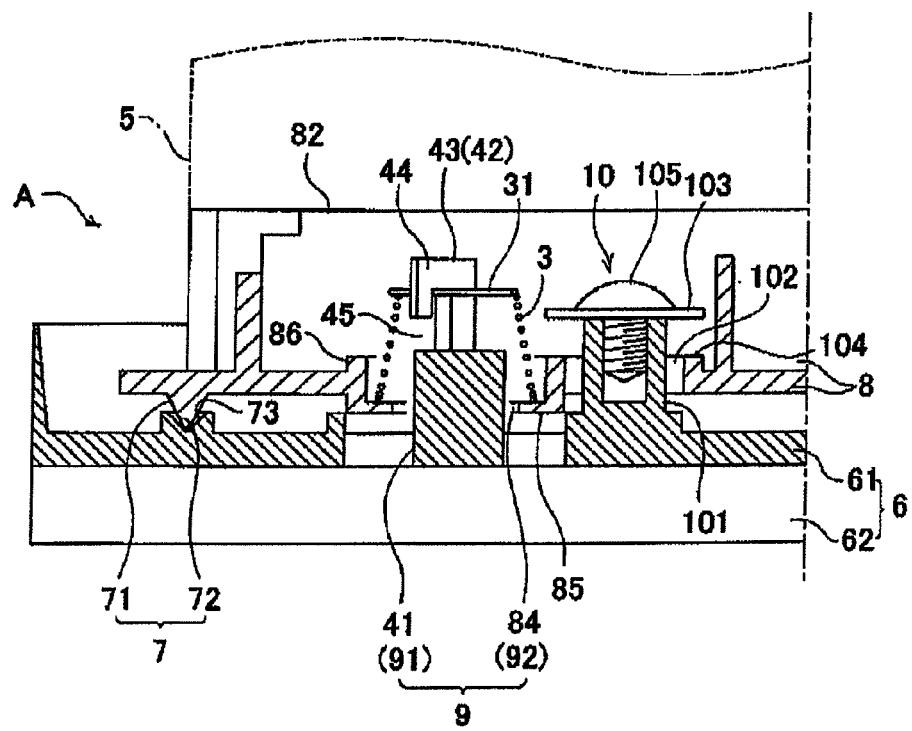
FIG. 7 is a partial cross sectional view of the panel attachment structure illustrated in FIG. 1.
Figure 8:
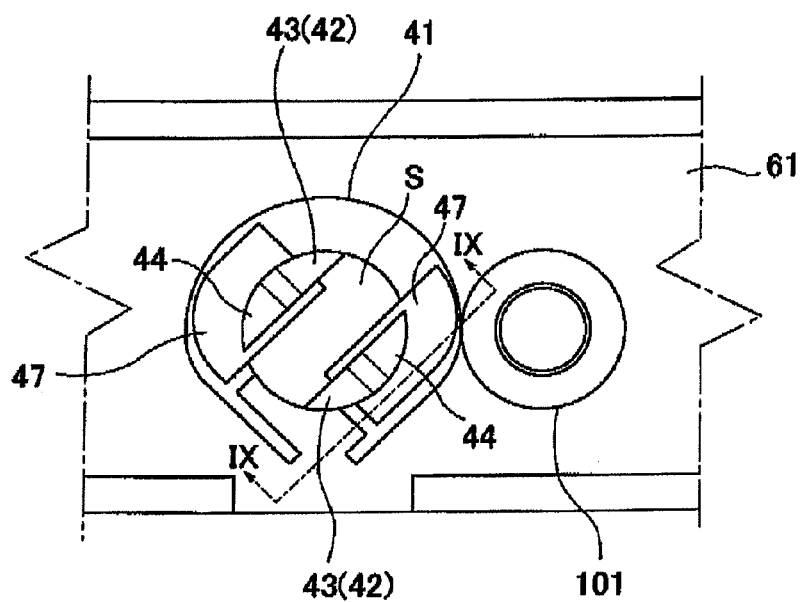
FIG. 8 is a partial rear elevational view of a hook component of the panel attachment structure illustrated in FIG. 1.
Figure 9:
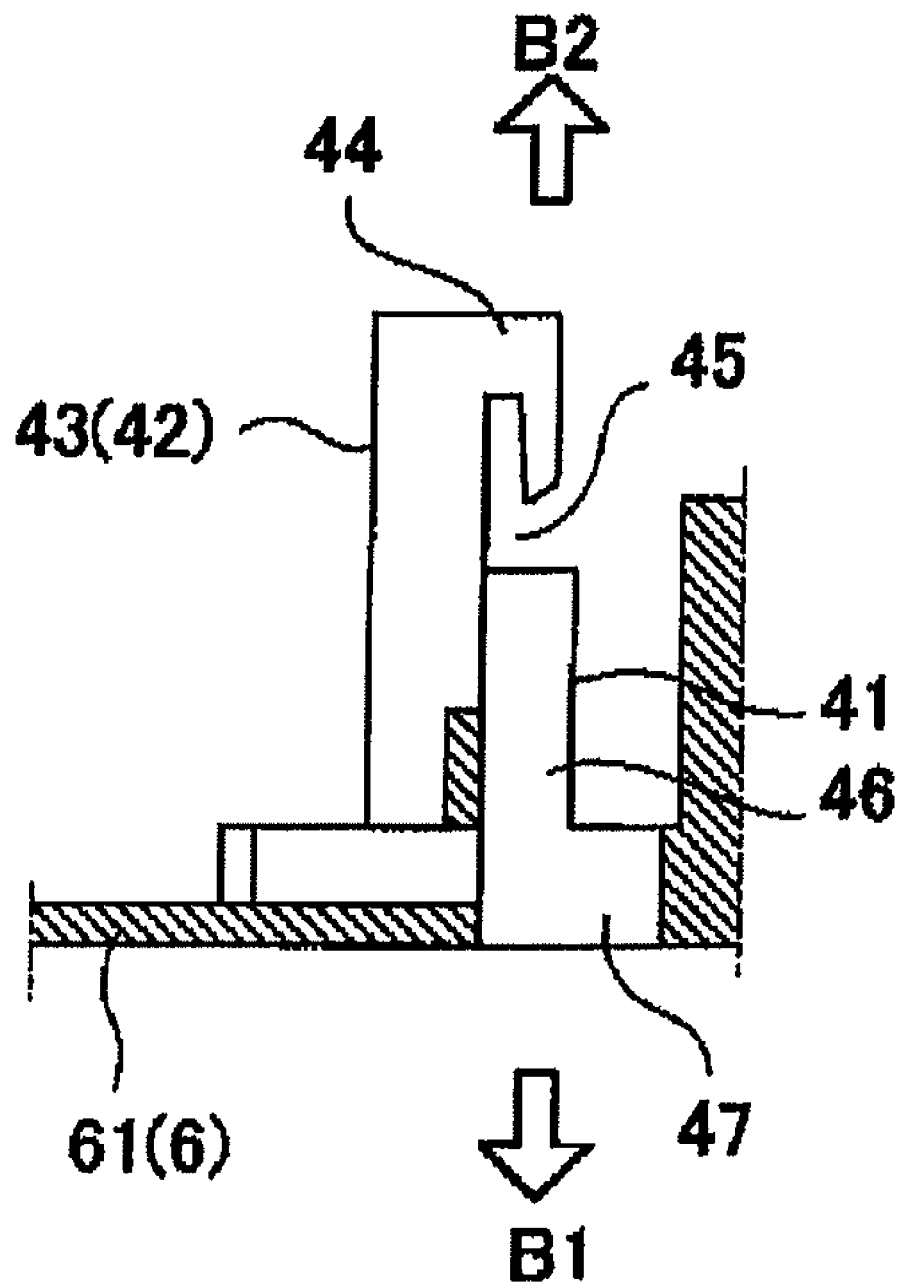
FIG. 9 is a cross sectional view of the hook component taken along IX-IX line in FIG. 8.
Figure 10:
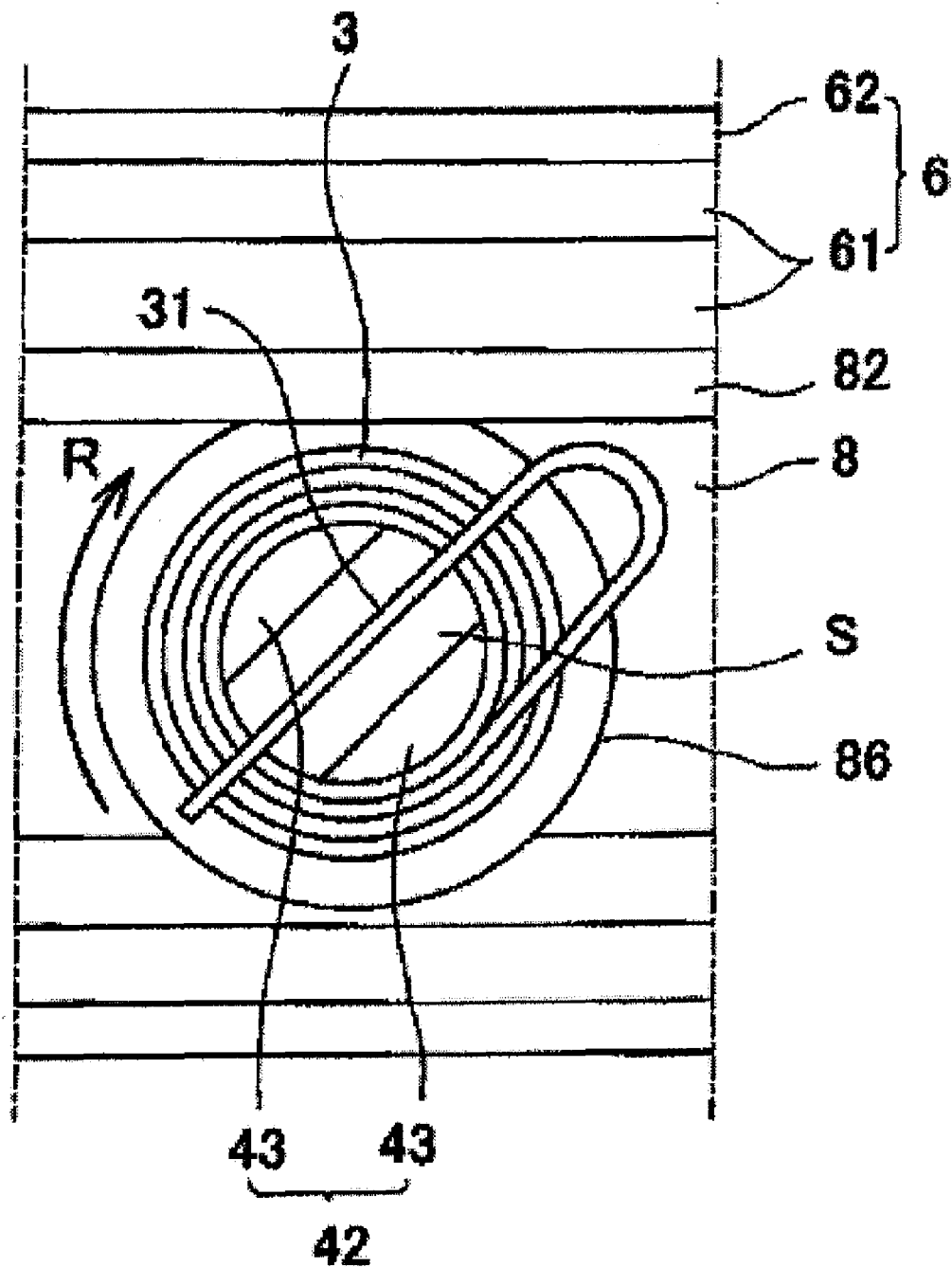
FIG. 10 is a partial rear elevational view of the panel attachment structure illustrated in FIG. 1.

As shown in FIGS. 3A to 5B and FIGS. 7 to 10, the decoration panel 6 has a pair of first protrusions 41 and a pair of hook components 42. The first protrusion 41 is formed in a cylindrical shape. The first protrusion 41 is provided to the panel main body 61. The hook component 42 is provided to the first protrusion 41. The hook component 42 extends in an axial direction of the first protrusion 41 from a top portion of the first protrusion 41. As shown in FIGS. 8 and 10, each of the hook components 42 is divided into a pair of hook elements 43. The hook elements 43 are opposite each other in a radial direction of the first protrusion 41 with a radial gap S therebetween. The hook elements 43 have shapes that are in point symmetry to each other with respect to a center axis of the first protrusion 41. The hook elements 43 extend in the axial direction of the first protrusion 41 from the top portion of the first protrusion 41 such that the hook elements 43 maintain a positional relationship in point symmetry. Each of the hook elements 43 has a catch (e.g., latching portion) 44 and a lateral hole 45. The catch 44 is formed in a hook-shape. Specifically, the catch 44 opens toward the first protrusion 41. The lateral hole 45 opens toward the radial gap S and extends toward the catch 44. As shown in FIGS. 3B, 4B, 5B and 7, the attachment frame 8 includes a pair of first openings 84 and a pair of spring seats 85 at locations corresponding to the first protrusions 41, respectively. The first opening 84 is formed in a circular shape. The first opening 84 is sufficiently larger in diameter than the first protrusion 41. The first opening 84 extends through the attachment frame 8. The first opening 84 is surrounded by the spring seat 85. The spring seat 85 is formed in a circular shape. The first protrusion 41 is loosely fitted into the first opening 84 with a gap therebetween. The decoration panel 6 and the attachment frame 8 are aligned in a overlapping state via a positioning mechanism 7.

As shown in FIG. 7, the spring body 3 is fitted around the first protrusion 41 and the hook component 42. One axial end portion of the spring body 3 is supported on the spring seat 85 of the attachment frame 8. The spring body 3 includes a straight latching end portion (e.g., straight end portion) 31 provided to the other axial end portion. The latching end portion 31 is latched by the catches 44 of the hook elements 43. In this state, the spring body 3 is supported between the catch 44 and the spring seat 85 in a state of being compressed in the axial direction of the first protrusion 41. Therefore, the decoration panel 6 is constantly pulled toward the attachment frame 8 by the elastic biasing action of the spring bodies 3. Since the attachment frame 8 is fixed to the front end portion of the disk tray 5, the decoration panel 6 is constantly biased by the spring body 3 toward the front end portion of the disk tray 5.

The panel attachment structure A further has the positioning mechanism 7, a displacement width restricting mechanism 9 and a stopper mechanism 10. The positioning mechanism 7 positions the decoration panel 6, which is biased by the spring body 3 toward the front end portion of the disk tray 5, in an initial position with respect to the disk tray 5. The displacement width restricting mechanism 9 restricts displacement width of the decoration panel 6 with respect to the disk tray 5 in the displacement direction. Specifically, the displacement width restricting mechanism 9 restricts displacement width of the decoration panel 6 with respect to the disk tray 5 in a direction that is perpendicular to the backward and forward directions.

As shown in FIG. 7, the positioning mechanism 7 includes a protrusion 71 and a concave component 72. The protrusion 71 is formed on the attachment frame 8 and includes a distal end portion. The distal end portion of the protrusion 71 is formed in a conical shape. The concave component 72 is formed on the panel main body 61 of the decoration panel 6. The concave component 72 has a conical inner face 73. The distal end portion of the protrusion 71 fits into the concave component 72. The positioning mechanism 7 is formed at two places spaced away from each other. Therefore, when the protrusions 71 are fitted into the concave components 72 at both of sites of the positioning mechanism 7 in a state in which the decoration panel 6 is pulled toward the attachment frame 8 by the spring body 3, the decoration panel 6 is positioned at the initial position with respect to the disk tray 5 to which the attachment frame 8 is immovably fixed. The positioning mechanism 7 is provided at two places, namely, two transversal ends in the width direction W (lengthwise direction) of the decoration panel 6 and the attachment frame 8. Thus, the positioning accuracy of the decoration panel 6 and the attachment frame 8, and the positioning accuracy in the initial position of the disk tray 5 and the decoration panel 6 are improved. With the positioning mechanism 7, the protrusion 71 can be formed on the decoration panel 6, and the concave component 72 can be formed on the attachment frame 8.

The displacement width restricting mechanism 9 includes a cylindrical shaft 91 and a circular hole 92. As shown in FIG. 7, the cylindrical shaft 91 is formed by the same member as the first protrusion 41. Furthermore, the circular hole 92 is formed by the same member as the first opening 84. The cylindrical shaft 91 is loosely fitted into the circular hole 92. With the displacement width restricting mechanism 9, the decoration panel 6 can be displaced in the displacement direction by an amount corresponding to a gap (that is, the play) around the cylindrical shaft 91. In other words, the decoration panel 6 can be displaced in the displacement direction that is perpendicular to the backward and forward directions with respect to the disk tray 5, but the amount of the displacement is restricted when the cylindrical shaft 91 contacts with an edge portion around the circular hole 92.

The stopper mechanism 10 restricts the amount of compression of the spring bodies 3 so that coils of the spring bodies 3 are not jammed together. As shown in FIG. 7, the stopper mechanism 10 has a second protrusion 101, a second opening 102, a flange (e.g., flange portion) 103 and a receiver (e.g., receiving portion) 104. The second protrusion 101 is formed in a cylindrical shape. The second protrusion 101 extends from the panel main body 61. The second opening 102 is formed in a circular shape. The second opening 102 extends through the attachment frame 8. The flange 103 is attached to the top portion of the second protrusion 101. The flange 103 is larger in diameter than the second protrusion 101. The receiver 104 is formed in a round ring-shape. The receiver 104 is formed by the edge portion of the second protrusion 101. The second protrusion 101 is loosely fitted into the second opening 102 with a gap therebetween. The receiver 104 is opposite the flange 103 with a axial gap inbetween. The gap between the second protrusion 101 and the edge portion of the second opening 102 is wider than the gap around the cylindrical shaft 91 that is loosely fitted in the circular hole 92. The axial gap between the flange 103 and the receiver 104 is set such that the coils of the spring bodies 3 will not be jammed together even when the flange 103 and the receiver 104 contact each other. The flange 103 is formed integrally with a head portion of a screw 105. The screw 105 is threaded into the top portion of the second protrusion 101. Specifically, the flange 103 is formed by a flange portion of the screw 105 by using a flanged screw for the screw 105.

FIGS. 4A to 6 illustrate assembly process of the panel attachment structure A.

With the panel attachment structure A, the positioning mechanism 7, the attachment structure of the spring bodies 3 and the stopper mechanism 10 are provided symmetrically at two places at the longitudinal ends of the decoration panel 6 and the attachment frame 8 in the width direction W.

Figure 4A:
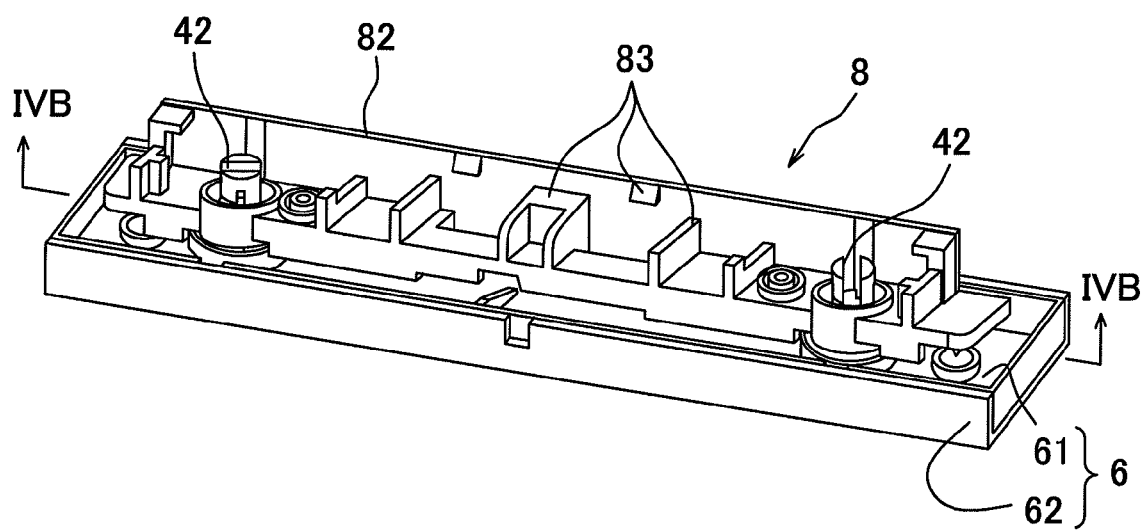
FIG. 4A is a detailed perspective view of an attachment frame and a decoration panel of the panel attachment structure illustrated in FIG. 1.
Figure 4B:
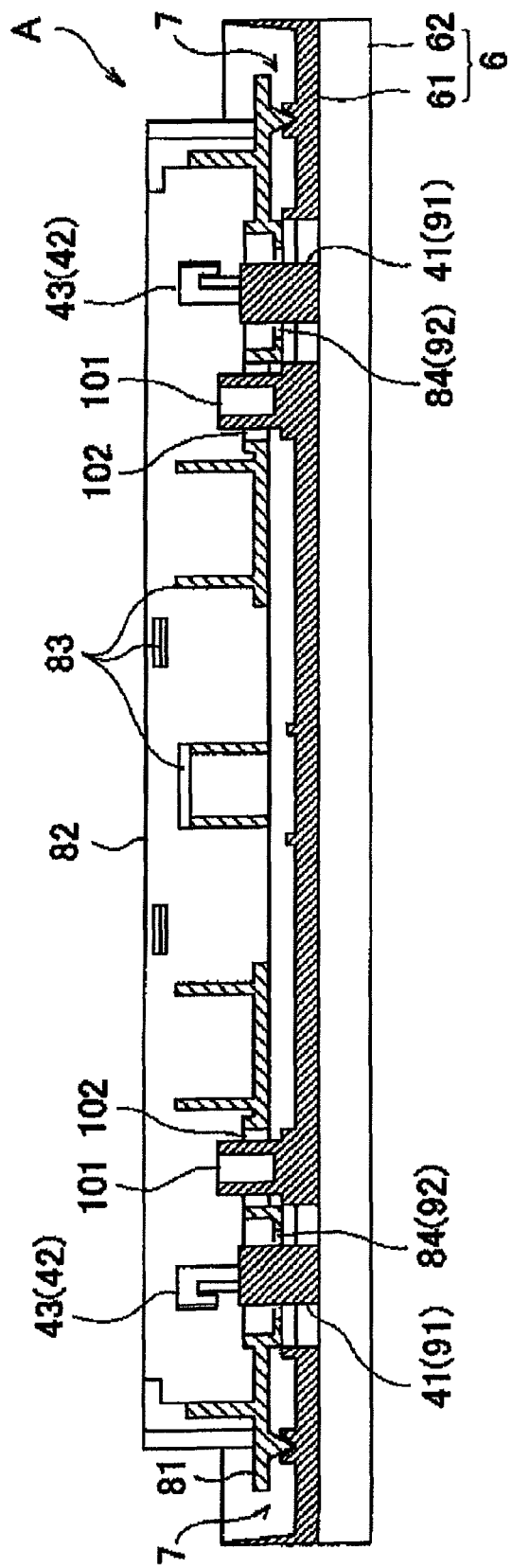
FIG. 4B is a cross sectional view of the attachment frame and the decoration panel of the panel attachment structure taken along IVA-IVA line in FIG. 4A.

As shown in FIG. 4B, at the initial stage of the assembly process, the attachment frame 8 is aligned overlapping with the panel main body 61. Specifically, the protrusions 71 of the positioning mechanism 7 are fitted into the concave components 72. As a result, the attachment frame 8 is positioned with respect to the panel main body 61. Also, the second protrusion 101 and the first protrusion 41 of the panel main body 61 are loosely fitted into the second opening 102 and the first opening 84 of the attachment frame 8, respectively. The cylindrical shaft 91 of the displacement width restricting mechanism 9 also serves as the first protrusion 41, and the circular hole 92 of the displacement width restricting mechanism 9 also serves as the first opening 84. Thus, the cylindrical shaft 91 is loosely fitted in the circular hole 92 by loosely fitting the first protrusion 41 of the panel main body 61 in the first opening 84 of the attachment frame 8.

Figure 5A:
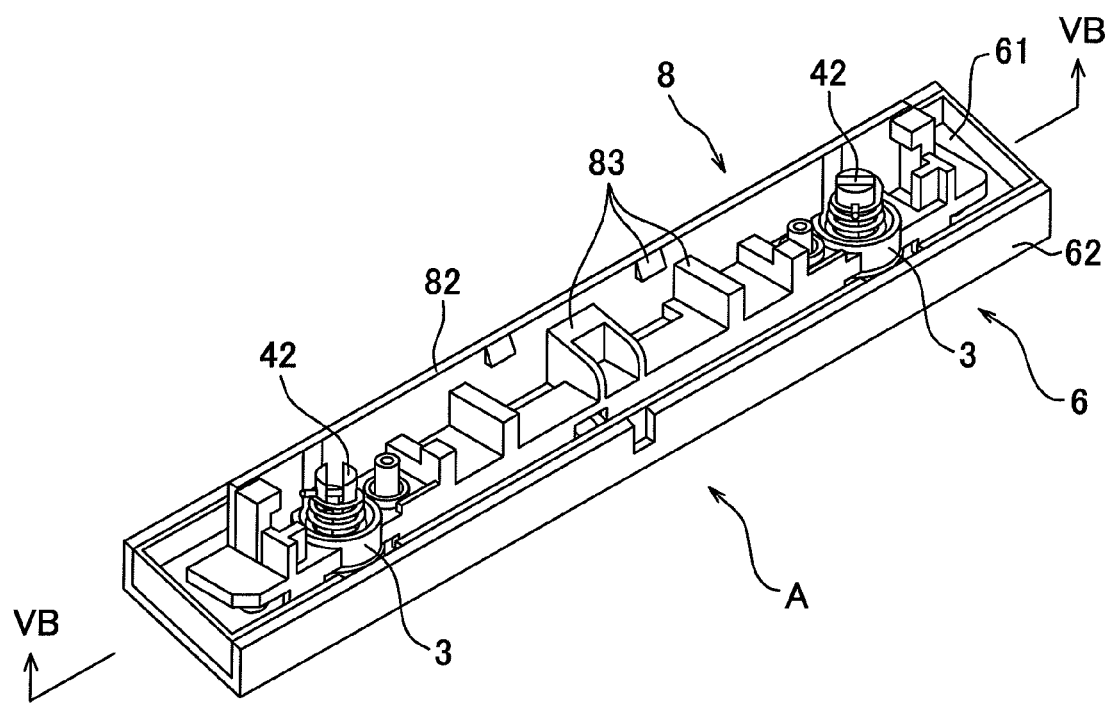
FIG. 5A is a rear perspective view of the panel attachment structure illustrated in FIG. 1.
Figure 5B:
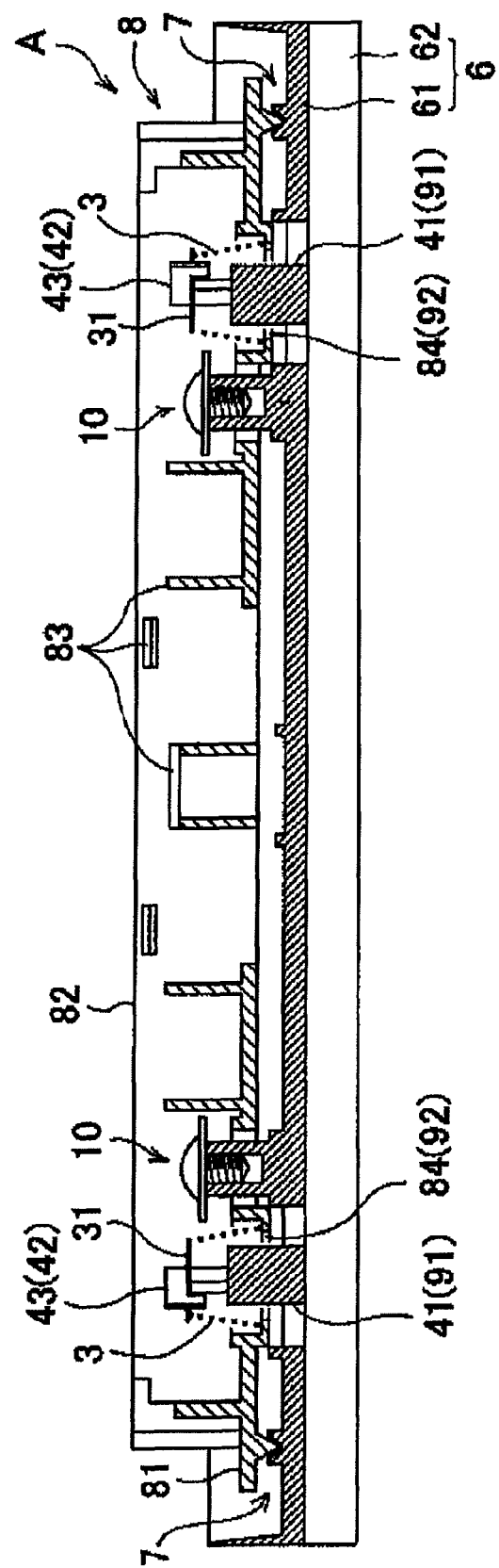
FIG. 5B is a cross sectional view of the panel attachment structure taken along VB-VB line in FIG. 5A.

In the next step, as shown in FIG. 5B, the spring body 3 is interposed between the hook component 42 on the attachment frame 8 and the spring seat 85 on the panel main body 61. This work will be described through reference to FIGS. 9 and 10. First, the spring body 3 is fitted around the first protrusion 41 and the hook component 42. Then, the one axial end portion of the spring body 3 is placed on the spring seat 85 on the panel main body 61. After this, as shown in FIG. 10, the latching end portion 31 provided at the other axial end portion of the spring body 3 is aligned with the radial gap S between the hook elements 43. Next, the latching end portion 31 is pushed into the radial gap S while the spring body 3 is compressed, so that the latching end portion 31 is pushed down to the lateral holes 45. Then, the latching end portion 31 is rotated to a location corresponding to the catches 44 through the lateral holes 45 of the hook elements 43 as indicated by the arrow R in FIG. 10. Finally, the force that is pushing the latching end portion 31 is released so that the spring body 3 recovers. As a result, the latching end portion 31 is latched to the catches 44. When the latching end portion 31 is latched to the catches 44 of the hook elements 43, a terminal of the latching end portion 31 preferably faces the blind plate 82 of the attachment frame 8. When the terminal of the latching end portion 31 faces the blind plate 82, there will be less risk that the worker will be injured by the terminal of the latching end portion 31. Furthermore, there will be less risk that the work will snag a finger or the like on the terminal of the latching end portion 31.

Figure 6:
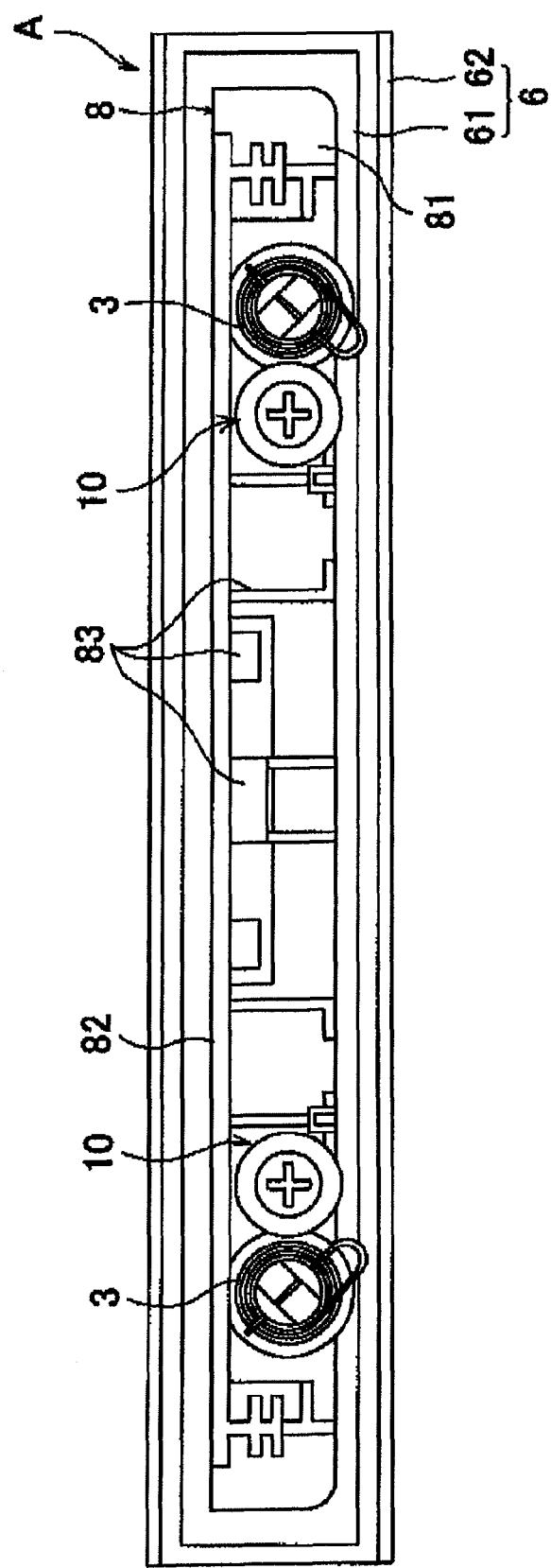
FIG. 6 is a rear elevational view of the panel attachment structure illustrated in FIG. 1.

When the assembly process is performed, as shown in FIGS. 5B and 6, the decoration panel 6 is attached to the attachment frame 8. Specifically, the attachment frame 8 and the decoration panel 6 are linked via the spring bodies 3.

With the panel attachment structure A, the attachment frame 8 is immovably fixed, via the attachment mechanism 83, to the front end portion of the disk tray 5 that protrudes to outside of the opening 21 of the front panel 1.

With the panel attachment structure A thus attached to the disk tray 5, the decoration panel 6 is merely linked to the attachment frame 8 by the spring bodies 3, and the displacement width restricting mechanism 9 merely restricts the displacement width of the decoration panel 6 with respect to the disk tray 5 in the displacement direction. Accordingly, as long as the decoration panel 6 does not restrict the displacement width, the decoration panel 6 with respect to the disk tray 5 can be displaced in the displacement direction that intersects the backward and forward directions.

As shown in FIG. 11, when the disk tray 5 moves out toward the ejected position on outside of the cabinet as indicated by the arrow Y1, the decoration panel 6 sticks out from the recess 2 of the front panel 1. In this state, since the biasing action of the spring bodies 3 causes the protrusions 71 of the positioning mechanism 7 to be fitted into the concave components 72, the decoration panel 6 is positioned with respect to the attachment frame 8. Therefore, the decoration panel 6 is positioned in the initial position with respect to the disk tray 5. The same applies when the disk tray 5 is ejected to the ejected protruding position on the outside of the cabinet. Therefore, when the decoration panel 6 is sticking out from the recess 2 of the front panel 1, the decoration panel 6 is positioned in the initial position with respect to the disk tray 5. This provides a neat appearance.

As shown in FIG. 12, when the disk tray 5 moves back to the retracted position on the inside of the cabinet as indicated by the arrow Y2, the decoration panel 6 contacts with the bottom portion 22 of the recess 2. Then, the disk tray 5 slightly compresses the spring bodies 3. Therefore, any error in the retracted position of the disk tray 5 can be easily absorbed by the spring bodies 3. Also, the protrusions 71 of the positioning mechanism 7 are released from the concave components 72 to release the positioned state. Accordingly, if the recess 2 is provided with a guide mechanism for guiding the decoration panel 6 to a center position of the recess 2, then the decoration panel 6 is guided by the guide mechanism and accurately positioned (centered) in the center position of the recess 2. The centering is performed by the decoration panel 6 being displaced with respect to the disk tray 5 or the attachment frame 8 fixed thereto. Thus, the adjustment width of the centering does not depend on the size of the assembly looseness of the disk tray 5 with respect to the loader.

As shown in FIG. 13, if the decoration panel 6 is pulled forward in the direction of the arrow Y1 by some kind of external force, such as manually by a person, the decoration panel 6 is forcibly pulled out. If this happens, there is the risk that the spring bodies 3 are compressed too tightly, the coils of the spring bodies 3 is jammed together, and the intended biasing action of the spring bodies 3 is lost. However, the panel attachment structure A has the stopper mechanism 10. Therefore, the flange 103 of the stopper mechanism 10 restricts the amount of compression of the spring bodies 3 by contacting with the receiver 104.

Figure 14:
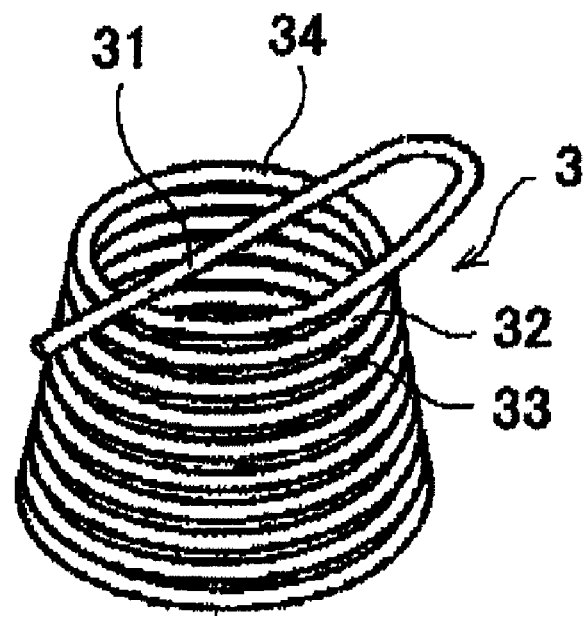
FIG. 14 is a perspective view of a spring body of the panel attachment structure illustrated in FIG. 1.
Figure 15:
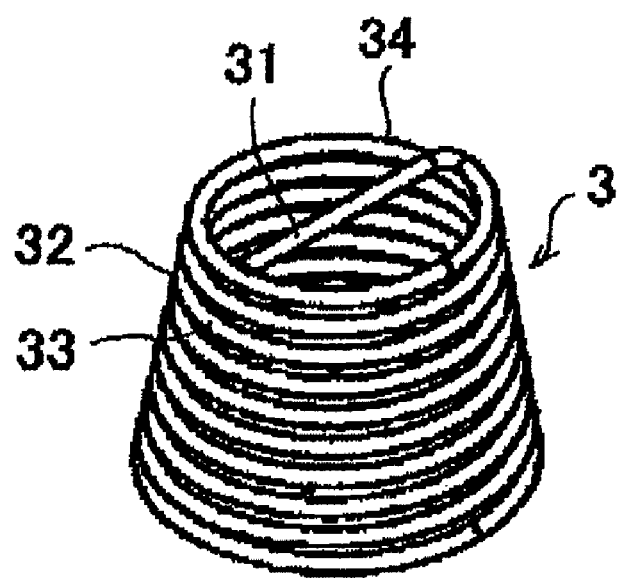
FIG. 15 is a perspective view of another spring body of the panel attachment structure illustrated in FIG. 1.

With the panel attachment structure A, the compression coil springs are used as the spring bodies 3 for linking the decoration panel 6 to the attachment frame 8. FIGS. 14 and 15 are perspective views of two kinds of compression coil spring that can be used in the panel attachment structure A.

The compression coil spring is formed in the shape of a truncated cone in side view. When the compression coil spring that is formed in the shape of the truncated cone in side view is used for the spring body 3, it is easy for the diameter of the one axial end portion of the spring body 3 to be matched to the size of the spring seat 85, and for the diameter of the other axial end portion of the spring body 3 to be matched to the size of the hook component 42. Also, with the compression coil spring, any one of adjacent pairs of coils 32 and 33 that are adjacent to each other in the axial direction are sized so that the diameter of the coil 33 on the side closer to the other axial end portion is smaller than the diameter of the coil 32 on the side closer to the one axial end. The difference between the diameters of the coils 32 and 33 is set such that axial projections of the coils 32 and 33 overlap. That is, when the compression coil spring is viewed in the axial direction, any one of adjacent pair of coils 32 and 33 is set such that the outer periphery of the smaller-diameter coil 32 overlaps the inner periphery of the larger-diameter coil 33.

When a compression coil spring is used as the spring body 3 as shown in FIG. 14, the latching end portion 31 provided to the other axial end portion sticks out on both radial sides of the coil 34 at the other axial end portion. Therefore, when the spring body 3 is compressed too tightly, as illustrated in FIG. 16, the latching end portion 31 engages with the coil 34. Thus, a situation will not occur in which the latching end portion 31 is jammed inside the coil 34 and the intended biasing action of the spring body 3 is lost. Therefore, when the spring body 3 shown in FIG. 14 is used, the stopper mechanism 10 can be omitted.

Figure 17:
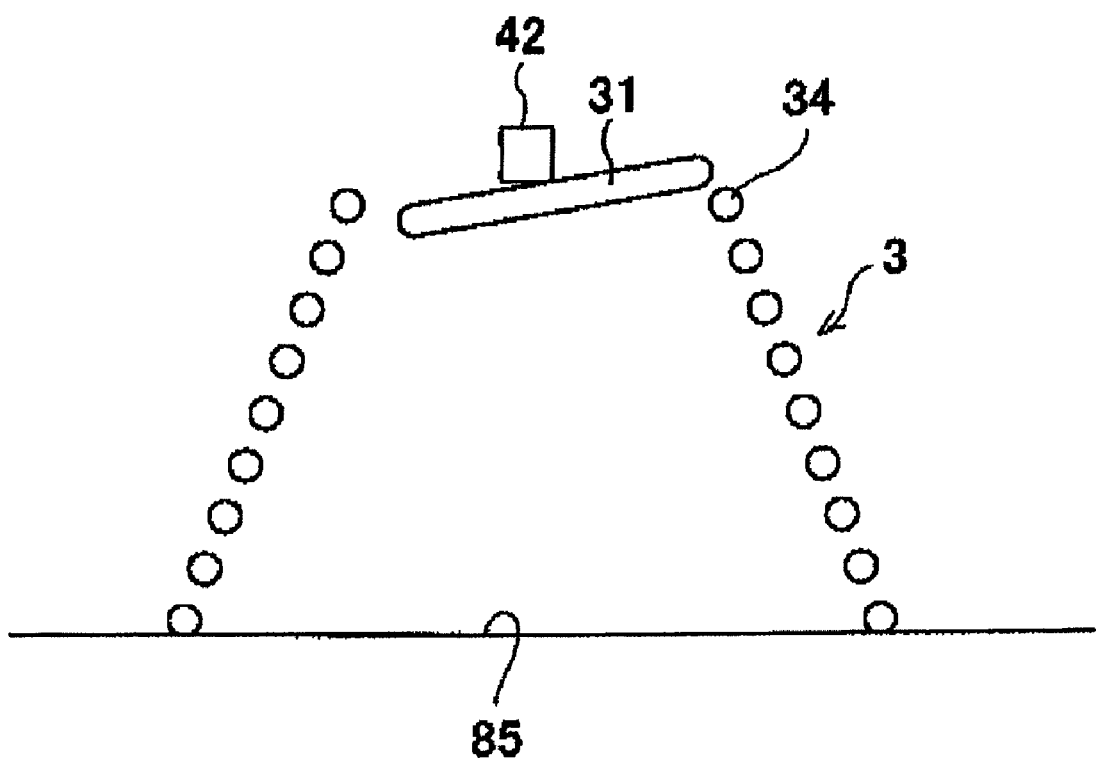
FIG. 17 is a diagram illustrating an action of the spring body illustrated in FIG. 15.

On the other hand, with the compression coil spring shown in FIG. 15, the latching end portion 31 is designed to be substantially the same size as the diameter of the coil 34 at the other axial end portion. Therefore, if the spring body 3 shown in FIG. 15 is compressed too tightly, as illustrated in FIG. 17, the latching end portion 31 can be jammed inside the coil 34 and the intended biasing action of the spring body 3 can be lost. However, by employing the stopper mechanism 10, it is possible to prevent the latching end portion 31 from being jammed inside the coil 34.

As shown in FIGS. 7 and 10, the attachment frame 8 further has a circular rib 86 formed around the periphery of the spring seat 85. The circular rib 86 extends from the periphery of the spring seat 85. The length of the latching end portion 31 of the spring body 3 shown in FIG. 14 is greater than the outside diameter of the circular rib 86. More specifically, the length of the latching end portion 31 of the spring body 3 shown in FIG. 14 is greater than the inside diameter of the circular rib 86. Accordingly, even if the spring body 3 shown in FIG. 14 is employed and the stopper mechanism 10 is left out as mentioned above, merely setting the circular rib 86 to a suitable height will result in the engagement of the latching end portion 31 with the circular rib 86. As a result, the latching end portion 31 is prevented from being jammed inside the coil 34 even if the spring body 3 is compressed too tightly.

Each of the hook elements 43 of the hook component 42 formed integrally with the panel main body 61 has the hook-shaped catch 44 that opens toward the first protrusion 41. Accordingly, it is conceivable that in addition to a two-piece mold, the mold used to form the panel main body 61 need to be a sliding mold which can slide at a right angle to the parting direction of the mold halves. In view of this, with the panel attachment structure A, an approach is taken whereby the panel main body 61 is molded with a two-piece mold alone.

Specifically, as shown in FIG. 9, the first protrusion 41 has cut-out portions (e.g., a pair of through holes) 46 that is cut out along the entire axial length of the first protrusion 41 in the axial direction. The cut-out portions 46 are located opposite the catches 44 and the lateral holes 45 of the hook elements 43. Also, openings 47 that communicate with the cut-out portions 46 of the first protrusion 41, respectively, are formed in the panel main body 61. The openings 47 are also shown in FIG. 2. The cut-out portions 46 and the openings 47 are formed by removing the mold used to form the panel main body 61. Thus, even though the hook elements 43 of the panel main body 61 have the hook-shaped catches 44 that open toward the first protrusion 41, the mold used to form the panel main body 61 need only be a two-piece mold. Thus, there is no need to use the sliding mold. The arrows B1 and B2 in FIG. 9 indicate the parting directions of the two-piece mold.

The cylindrical shaft 91 and circular hole 92 of the displacement width restricting mechanism 9 can be formed separately at different locations from where the first protrusion 41 and the first opening 84 are formed. Specifically, the cylindrical shaft 91 and circular hole 92 of the displacement width restricting mechanism 9 can also serve as the second protrusion 101 and the second opening 102, respectively.

With the panel attachment structure A, the decoration panel 6 can be displaced with respect to the disk tray 5 in the displacement direction that intersects the backward and forward directions. Thus, the decoration panel 6 that has been fitted into the recess 2 of the cabinet can be easily centered in the recess 2. Also, a compression coil spring is used for the spring body 3 that links the attachment frame 8 and the decoration panel 6. Thus, it is easier for the spring body 3 to be interposed between the attachment frame 8 and the decoration panel 6. As a result, the assembly work can be carried out more quickly and easily in a larger space.

With the panel attachment structure A, the stopper mechanism 10 restricts the amount of compression of the spring body 3 so that the coils of the spring body 3 are not jammed together. Thus, a situation does not occur in which the spring body 3 is compressed too tightly and the coils are jammed together. Accordingly, the intended biasing action of the spring body 3 can be achieved.

With the panel attachment structure A, the displacement width restricting mechanism 9 has the cylindrical shaft 91 that protrudes from the decoration panel 6, and the circular hole 92 that is made in the attachment frame 8. The cylindrical shaft 91 is loosely fitted to the circular hole 92 with the gap therebetween. Thus, the displacement width restricting mechanism 9 has a simple configuration. Furthermore, the displacement width restricting mechanism 9 does not complicate the configuration of the mold used to form the attachment frame 8 or the decoration panel 6.

With the panel attachment structure A, the positioning mechanism 7 is provided at two places spaced apart. The one positioning mechanism 7 has the protrusion 71 and the concave component 72. The protrusion 71 has the conical distal end portion and is provided to one of the decoration panel 6 and the attachment frame 8. The concave component 72 is provided to the other of the decoration panel 6 and the attachment frame 8, and has the conical inner face 73 into which the conical distal end portion of the protrusion 71 fits. Thus, even if the disk tray 5 moves out so that the decoration panel 6 sticks out in front of the recess 2 in the front panel 1, the decoration panel 6 can be properly positioned at the initial position with respect to the disk tray 5. Therefore, the appearance of the decoration panel 6 can be improved. Furthermore, the displacement width restricting mechanism 9 does not complicate the configuration of the mold used to form the attachment frame 8 or the decoration panel 6.

With the panel attachment structure A, the attachment frame 8 has the first opening 84 and the spring seat 85. The first opening 84 extends through the attachment frame 8. The spring seat 85 supports the one axial end portion of the spring body 3. The decoration panel 6 has the first protrusion 41. The first protrusion 41 loosely fits into the first opening 84 with the gap therebetween. The first protrusion 41 has the hook component 42. The spring body 3 is fitted around the hook component 42. The hook component 42 latches the other axial end portion of the spring body 3, thereby keeps the spring body 3 in the compressed state. With this constitution, no extra parts are needed to install the spring body 3. Furthermore, since the hook component 42 that is necessary for installing the spring body 3 is located inside of the spring body 3, there is no need to leave space outside the spring body 3 for installing the hook component 42. As a result, the attachment frame 8 can be correspondingly made smaller.

With the panel attachment structure A, the spring body 3 has the latching end portion 31 in the form of a straight line that traverses in the radial direction of the coils of the other axial end portion. The hook component 42 sticks out in the axial direction of the first protrusion 41 from the top portion of the first protrusion 41. The hook component 42 is divided into the hook elements 43 that are opposite each other in the radial direction of the first protrusion 41. The hook elements 43 have the radial gap S which allows the latching end portion 31 to be inserted. Each of the hook elements 43 has the catch 44 on which the latching end portion 31 is caught, and the lateral hole 45 for rotating the latching end portion 31 that has been pushed into the radial gap S around the axis of the spring body 3 and guiding the latching end portion 31 to the catch 44. The catches 44 and the lateral holes 45 are provided so as to maintain a positional relationship in point symmetry. Thus, after the latching end portion 31 of the spring body 3 placed on the spring seat 85 of the attachment frame 8 has been pushed into the radial gap S, the latching end portion 31 is rotated around the axis of the spring body 3, put into the lateral hole 45, and guided to the catch 44. Thus, the spring body 3 can be installed by a simple operation.

With the panel attachment structure A, the first protrusion 41 is cut out along the entire length in the axial direction at locations opposite the lateral holes 45 and the catches 44 of the hook elements 43. Furthermore, the openings 47 that communicate with the cut-out portions of the first protrusion 41 are formed in the decoration panel 6. The cut-out portions and the openings 47 are formed by removing the mold used to form the decoration panel 6. Thus, the mold use to form the decoration panel 6 can have a simpler configuration.

With the panel attachment structure A, the spring body 3 has the truncated conical shape. The spring body 3 has the adjacent pairs of the coils that are adjacent to one another in the axial direction. The diameter of the coil closer to the one axial end portion is larger than the diameter of the coil closer to the other axial end portion. The difference in the diameters of the adjacent pair of the coils is set such that the axial projections of the coils overlaps. The circular rib 86 is provided around the periphery of the spring seat 85. The latching end portion 31 sticks out on both sides of the coil at the other axial end portion of the spring body 3 so as to be longer than the outside diameter of the circular rib 86. With this constitution, a situation does not occur in which the spring body 3 is compressed too tightly and the coils are jammed together. Thus, the intended biasing action of the spring body 3 can be achieved.

With the panel attachment structure A, the stopper mechanism 10 has the second protrusion 101, the second opening 102, the flange 103 and the receiver 104. The second protrusion 101 protrudes from the decoration panel 6. The second opening 102 extends through the attachment frame 8. The second protrusion 101 is loosely fitted into the second opening 102 with the gap therebetween. The flange 103 is attached to the top part of the second protrusion 101. The flange 103 is larger in diameter than the second opening 102. The receiver 104 is formed by the edge of the second opening 102 and is opposite the flange 103. When the flange 103 and the receiver 104 contact, the coils of the spring body 3 are prevented from being jammed together. Thus, the intended biasing action of the spring body 3 can be achieved.

With the panel attachment structure A, the flange 103 is integrally formed with the screw 105 that is threaded into the top part of the second protrusion 101.

With the panel attachment structure A, the cylindrical shaft 91 of the displacement width restricting mechanism 9 serves as the first protrusion 41 by being in the same location as the first protrusion 41. The circular hole 92 of the displacement width restricting mechanism 9 also serves as the first opening 84 by being in the same location as the first opening 84. Also, the cylindrical shaft 91 of the displacement width restricting mechanism 9 also can serve as the second protrusion 101 by being in the same location as the second protrusion 101, and the circular hole 92 of the displacement width restricting mechanism 9 also can serve as the second opening 102 by being in the same location as the second opening 102.

Since the spring body 3 is used to displaceably link the decoration panel 6 to the attachment frame 8 fixed to the disk tray 5, the decoration panel 6 fitted into the recess 2 in the cabinet can be easily centered in the recess 2. Also, because a compression coil spring is used as the spring body 3, assembly becomes easier than the conventional structure. Furthermore, with the panel attachment structure A, the action of the displacement width restricting mechanism 9 prevents the decoration panel 6 from being unnecessarily displaced with respect to the disk tray 5. Furthermore, the action of the positioning mechanism 7 positions the decoration panel 6 in the initial position with respect to the disk tray 5. Thus, the appearance can be improved, even if the disk tray 5 moves out so that the decoration panel 6 sticks out in front of the recess 2 in the cabinet.

Furthermore, the spring body 3 is prevented from being compressed too tightly. Thus, the intended biasing action of the spring body 3 can be obtained.

Furthermore, the configuration of the mold used to form the decoration panel 6 or the attachment frame 8 can be simplified.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A panel attachment structure for a disk tray, comprising:
    an attachment frame non-movably coupled to a front end portion of the disk tray, the disk tray being movable between an ejected position and a retracted position through a tray opening of a cabinet, the ejected position being located outside of the cabinet, the retracted position being located inside of the cabinet;
    a decoration panel movably coupled to the attachment frame and arranged to cover the tray opening of the cabinet from outside of the cabinet when the disk tray is retracted to the retracted position;
    a spring body including a compression coil spring, the spring body elastically coupling the decoration panel to the attachment frame and biasing the decoration panel against the attachment frame such that the spring body allows displacement of the decoration panel relative to the attachment frame in a displacement direction intersecting with a movement direction of the disk tray between the ejected position and the retracted position;
    a restricting mechanism arranged to restrict the displacement of the decoration panel relative to the attachment frame in the displacement direction; and
    a positioning mechanism selectively positioning the decoration panel relative to the attachment frame in a predetermined position and releasing the decoration panel from the predetermined position when the disk tray is retracted to the retracted position,
    the attachment frame having a first opening that extends through the attachment frame and a spring seat that supports one axial end portion of the spring body, and
    the decoration panel having a first protrusion that is loosely disposed through the first opening of the attachment frame and a hook component that is provided to the first protrusion, the spring body being disposed around the hook component and latched by the hook component at the other axial end portion of the spring body such that the spring body is compressed between the hook component of the decoration panel and the spring seat of the attachment frame as the disk tray approaches the retracted position from the ejected position.

2. The panel attachment structure according to claim 1, wherein
    the cabinet includes a recess portion that has a bottom portion with the tray opening, and
    the decoration panel is disposed within the recess portion such that the decoration panel faces the bottom portion of the recess portion to cover the tray opening of the cabinet from outside of the cabinet when the disk tray is retracted to the retracted position.

3. The panel attachment structure according to claim 1, wherein
    the restricting mechanism is arranged to restrict the displacement of the decoration panel relative to the attachment frame in the displacement direction that is perpendicular to the movement direction of the disk tray.

4. The panel attachment structure according to claim 1, further comprising
    a stopper mechanism arranged to restrict compression of the spring body to prevent coils of the spring body from being jammed each other.

5. The panel attachment structure according to claim 1, wherein
    the restricting mechanism includes a cylindrical shaft that protrudes from the decoration panel and a circular hole that is formed in the attachment frame with the cylindrical shaft of the decoration panel being loosely disposed through the circular hole of the attachment frame.

6. The panel attachment structure according to claim 1, wherein
    the positioning mechanism includes a pair of positioning components spaced apart from each other, with each of the positioning components having a protrusion portion with a conical distal end that is formed on one of the decoration panel and the attachment frame and a concave portion with a conical inner face that is formed on the other of the decoration panel and the attachment frame, the conical inner face of the concave portion selectively receiving the conical distal end of the protrusion.

7. A panel attachment structure for a disk tray, comprising:
an attachment frame non-movably coupled to a front end portion of the disk tray, the disk tray being movable between an ejected position and a retracted position through a tray opening of a cabinet, the ejected position being located outside of the cabinet, the retracted position being located inside of the cabinet;
a decoration panel movably coupled to the attachment frame and arranged to cover the tray opening of the cabinet from outside of the cabinet when the disk tray is retracted to the retracted position;
a spring body including a compression coil spring, the spring body elastically coupling the decoration panel to the attachment frame and biasing the decoration panel against the attachment frame such that the spring body allows displacement of the decoration panel relative to the attachment frame in a displacement direction intersecting with a movement direction of the disk tray between the ejected position and the retracted position;
a restricting mechanism arranged to restrict the displacement of the decoration panel relative to the attachment frame in the displacement direction; and
a positioning mechanism selectively positioning the decoration panel relative to the attachment frame in a predetermined position and releasing the decoration panel from the predetermined position when the disk tray is retracted to the retracted position,
the attachment frame having a first opening that extends through the attachment frame and a spring seat that supports one axial end portion of the spring body,
the decoration panel having a first protrusion that is loosely disposed through the first opening of the attachment frame and a hook component that is provided to the first protrusion, the spring body being disposed around the hook component and latched by the hook component at the other axial end portion of the spring body such that the spring body is compressed between the hook component of the decoration panel and the spring seat of the attachment frame,
the other axial end portion of the spring body including a straight end portion that extends across the other axial end portion of the spring body in a radial direction of the spring body, and
the hook component of the decoration panel including a pair of hook elements that extends from an axial end portion of the first protrusion in an axial direction of the first protrusion with the hook elements being arranged spaced apart in point symmetry around a central axis of the first protrusion with a radial gap therebetween, each of the hook elements having a latching portion that latches the straight end portion of the spring body, the straight end portion of the spring body being latched by the latching portions of the hook elements by being pushed through the radial gap of the hook elements and rotated around a center axis of the spring body.

8. The panel attachment structure according to claim 7, wherein
the first protrusion of the decoration panel has a pair of through holes that are formed at locations facing the latching portions of the hook component in the axial direction of the first protrusion with the through holes extending along the axial direction of the first protrusion through the decoration panel.

9. The panel attachment structure according to claim 7, wherein
the spring body includes coils formed in a truncated conical shape with each one of adjacent pairs of the coils of the spring body including a small diameter coil and a large diameter coil that has a larger diameter than the small diameter coil and that is located closer to the one axial end portion of the spring body than the small diameter coil, the small and large coils of the spring body have diameters such that axial projections of the small and large coils overlap, respectively, and
the spring seat of the attachment frame includes a bottom portion that supports the one axial end portion of the spring body in the axial direction of the spring body and a circular rib formed around the bottom portion, the circular rib having a inside diameter smaller than length of the straight end portion of the spring body.

10. A panel attachment structure for a disk tray, comprising:
an attachment frame non-movably coupled to a front end portion of the disk tray, the disk tray being movable between an ejected position and a retracted position through a tray opening of a cabinet, the ejected position being located outside of the cabinet, the retracted position being located inside of the cabinet;
a decoration panel movably coupled to the attachment frame and arranged to cover the tray opening of the cabinet from outside of the cabinet when the disk tray is retracted to the retracted position;
a spring body including a compression coil spring, the spring body elastically coupling the decoration panel to the attachment frame and biasing the decoration panel against the attachment frame such that the spring body allows displacement of the decoration panel relative to the attachment frame in a displacement direction intersecting with a movement direction of the disk tray between the ejected position and the retracted position;
a restricting mechanism arranged to restrict the displacement of the decoration panel relative to the attachment frame in the displacement direction;
a positioning mechanism selectively positioning the decoration panel relative to the attachment frame in a predetermined position and releasing the decoration panel from the predetermined position when the disk tray is retracted to the retracted position; and
a stopper mechanism arranged to restrict compression of the spring body to prevent coils of the spring body from being jammed each other,
the stopper mechanism including a second protrusion that protrudes from the decoration panel, a second opening that extends through the attachment frame with the second protrusion of the decoration panel being loosely disposed through the second opening of the attachment frame, a flange portion that is provided to the second protrusion and has a larger diameter than the second opening, and a receiving portion that is formed on a edge portion of the second opening and faces the flange portion, the stopper mechanism restricting the compression of the spring body when the flange portion contacts with the receiving portion.

11. The panel attachment structure according to claim 10, wherein
the flange portion of the stopper mechanism is integrally formed with a screw head of a screw that is threaded into an axial end portion of the second protrusion.

12. The panel attachment structure according to claim 1, wherein the restricting mechanism includes the first opening of the attachment frame and the first protrusion of the decoration panel.

13. The panel attachment structure according to claim 10, wherein
the restricting mechanism includes the second opening of the attachment frame and the second protrusion of the decoration panel.

* * * * *